(12) United States Patent
Otani

(10) Patent No.: US 11,648,802 B2
(45) Date of Patent: May 16, 2023

(54) TYRE FOR A MOTORCYCLE

(71) Applicant: Sumitomo Rubber Industries, Ltd., Kobe (JP)

(72) Inventor: Masafumi Otani, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 600 days.

(21) Appl. No.: 16/690,479

(22) Filed: Nov. 21, 2019

(65) Prior Publication Data

US 2020/0189320 A1 Jun. 18, 2020

(30) Foreign Application Priority Data

Dec. 13, 2018 (JP) .............................. JP2018-233474

(51) Int. Cl.
*B60C 11/03* (2006.01)
*B60C 11/13* (2006.01)

(52) U.S. Cl.
CPC ............ *B60C 11/03* (2013.01); *B60C 11/032* (2013.01); *B60C 11/0306* (2013.01);
(Continued)

(58) Field of Classification Search
CPC ............... B60C 11/047; B60C 11/1369; B60C 11/1353; B60C 11/0306; B60C 11/04;
(Continued)

(56) References Cited

U.S. PATENT DOCUMENTS

D246,640 S * 12/1977 Matsuda ...................... D12/572
4,240,484 A * 12/1980 Kojima ................... B60C 11/11
152/209.11
(Continued)

FOREIGN PATENT DOCUMENTS

BE 739495 A 3/1970
DE 2439092 A1 2/1975
(Continued)

OTHER PUBLICATIONS

English machine translation of JPH 06-239107. (Year: 1994).*
Extended European Search Report, dated May 4, 2020, for European Application No. 19208836.7.

*Primary Examiner* — Robert C Dye
(74) *Attorney, Agent, or Firm* — Birch, Stewart, Kolasch & Birch, LLP

(57) ABSTRACT

A tyre for a motorcycle includes a tread portion. The tread portion includes a crown longitudinal groove extending in a tyre circumferential direction on a side of a tyre equator, a shoulder longitudinal groove extending in the tyre circumferential direction on a side of a first tread edge, and a middle groove arranged between the crown longitudinal groove and the shoulder longitudinal groove. The middle groove includes a plurality of middle main groove portions arranged in the tyre circumferential direction and each protruding toward the tyre equator or the first tread edge. Each of the middle main groove portions is formed in a bent line shape or in an arc shape. Each of the middle main groove portions includes a shallow bottom portion having a groove depth smaller than a maximum groove depth of the shoulder longitudinal groove and a maximum groove depth of the crown longitudinal groove.

17 Claims, 9 Drawing Sheets

(52) U.S. Cl.
CPC ... *B60C 11/1369* (2013.01); *B60C 2011/0344* (2013.01); *B60C 2011/0346* (2013.01); *B60C 2011/0353* (2013.01); *B60C 2011/0355* (2013.01); *B60C 2011/0358* (2013.01); *B60C 2200/10* (2013.01)

(58) Field of Classification Search
CPC .............. B60C 11/032; B60C 11/0323; B60C 2011/1361; B60C 2011/0346; B60C 2011/0348
See application file for complete search history.

(56) References Cited

U.S. PATENT DOCUMENTS 4,289,182 A    9/1981  Sato et al.
4,388,960 A *  6/1983  Wada ................. B60C 11/0306
                                              152/209.17

FOREIGN PATENT DOCUMENTS

| DE | 2951744 A1 | | 7/1980 |
| GB | 1445873 A | | 8/1976 |
| JP | 59-227510 A | | 12/1984 |
| JP | H 06-239107 | * | 8/1994 |

* cited by examiner

TYRE FOR A MOTORCYCLE

TECHNICAL FIELD

The present invention relates to a tyre for a motorcycle.

BACKGROUND ART

Japanese Unexamined Patent Application Publication No. S59-227510 describes a tyre for a motorcycle provided in a tread with grooves extending in a tyre circumferential direction. The grooves include a groove arranged in a crown portion, a pair of grooves each arranged on a side of a respective one of tread edges, a pair of grooves each arranged between the crown portion and a respective one of the tread edges. Each of the grooves arranged between the crown portion and a respective one of the tread edges is formed by portions each convex toward a side of the crown portion and portions each convex toward a side of a respective one of the tread edges arranged alternately in the tyre circumferential direction.

SUMMARY OF THE INVENTION

In the peripheral regions of the convex portions described above, in the tyre circumferential direction and in a tyre axial direction, portions where the grooves are formed and portions where the grooves are not formed alternately come into contact with the ground during running, therefore, it is possible that uneven wear is generated.

The present invention was made in view of the above, and a primary object thereof is to provide a tyre for a motorcycle capable of improving uneven wear resistance performance.

In one aspect of the present invention, a tyre includes a tread portion including a crown longitudinal groove extending in a tyre circumferential direction on a side of a tyre equator, a shoulder longitudinal groove extending in the tyre circumferential direction on a side of a first tread edge, and a middle groove arranged between the crown longitudinal groove and the shoulder longitudinal groove, wherein the middle groove includes a plurality of middle main groove portions arranged in the tyre circumferential direction and each protruding toward the tyre equator or the first tread edge, each of the middle main groove portions is formed in a bent line shape or in an arc shape by three or more linear elements connected with each other, and each of the middle main groove portions includes a shallow bottom portion having a groove depth smaller than a maximum groove depth of the shoulder longitudinal groove and a maximum groove depth of the crown longitudinal groove.

In another aspect of the invention, it is preferred that the shallow bottom portion is arranged on an outer side in a tyre radial direction of a virtual line obtained by smoothly connecting a groove bottom where the shoulder longitudinal groove has the maximum groove depth and a groove bottom where the crown longitudinal groove has the maximum groove depth along an outer surface profile of the tread portion.

In another aspect of the invention, it is preferred that when the tread portion is developed in a plane, each of the middle main groove portions is line-symmetric with respect to a tyre axial direction line passing through a center position in the tyre circumferential direction of the middle main groove portion.

In another aspect of the invention, it is preferred that each of the middle main groove portions has a pair of bent portions formed by the linear elements connected with each other on both sides in the tyre circumferential direction of the center position, and the shallow bottom portion is provided between the pair of the bent portions.

In another aspect of the invention, it is preferred that the shallow bottom portion is formed over a region of 25% or more of a length in the tyre circumferential direction of each of the middle main groove portions from the center position on both sides thereof in the tyre circumferential direction.

In another aspect of the invention, it is preferred that the shallow bottom portion is formed over the entire length of each of the middle main groove portions.

In another aspect of the invention, it is preferred that the groove depth of the shallow bottom portion is smaller by 0.5 mm or more than the larger one of the maximum groove depth of the shoulder longitudinal groove and the maximum groove depth of the crown longitudinal groove, and 0.6 times or more of the larger one of the maximum groove depth of the shoulder longitudinal groove and the maximum groove depth of the crown longitudinal groove.

In another aspect of the invention, it is preferred that an outer end in the tyre axial direction of the middle groove is arranged at a position within 25% of a tread development width from the tyre equator toward the first tread edge.

In another aspect of the invention, it is preferred that the middle groove is formed by the middle main groove portions directly connected with each other.

In another aspect of the invention, it is preferred that the middle groove is formed by the middle main groove portions indirectly connected with each other via middle joint groove portions.

In another aspect of the invention, it is preferred that a groove width of each of the middle joint groove portions is smaller than a groove width of each of the middle main groove portions.

In another aspect of the invention, it is preferred that the middle groove is formed by the middle main groove portions not directly or indirectly connected with each other.

In another aspect of the invention, it is preferred that the shoulder longitudinal groove has a plurality of shoulder protruding portions each extending continuously in the tyre circumferential direction and protruding toward the tyre equator or the first tread edge, and the middle main groove portions and the shoulder protruding portions are aligned in the tyre circumferential direction.

DESCRIPTION OF THE PREFERRED EMBODIMENT

An embodiment of the present invention will now be described below in detail in conjunction with accompanying drawings.

Figure 1:
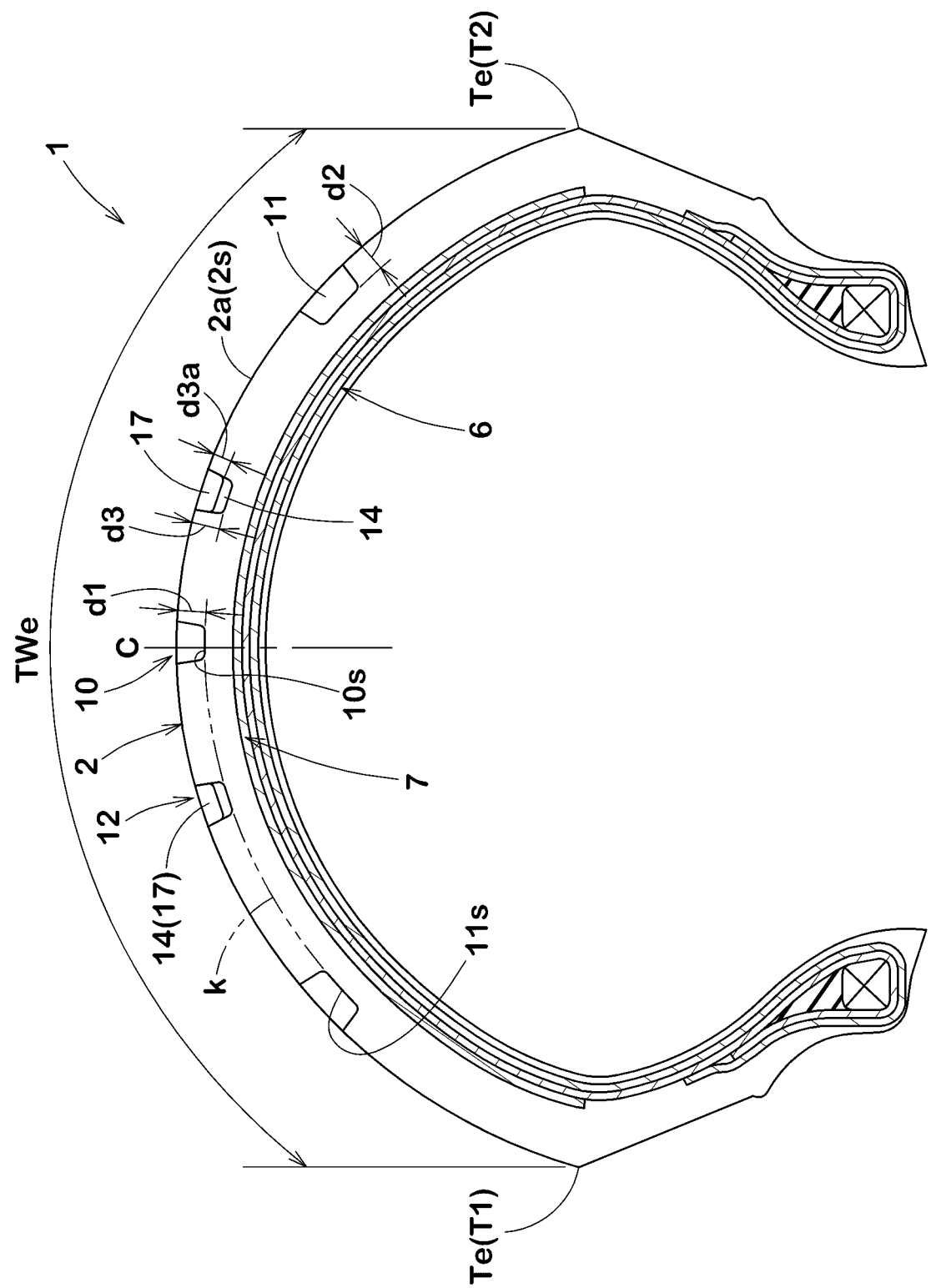
FIG. 1 is a tyre meridian section of a pneumatic tyre according to an embodiment of the present invention.

FIG. 1 is a tyre meridian section of a tyre 1 for a motorcycle according to an embodiment of the present invention (hereinafter, may simply be referred to as "tyre 1") in a standard state. FIG. 1 shows a tyre 1 suitable for a motorcycle called "naked bike", for example. Note that the present invention is not limited to such an embodiment and it may be applied to a tyre for a motorcycle of various kinds.

The "standard state" is a state in which the tyre 1 is mounted on a standard rim, inflated to a standard inner pressure, and loaded with no tyre load.
In this specification, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

In the tyre 1 in this embodiment, a tread ground contacting surface (2a) of a tread portion 2 extends between tread edges (Te) in a curved manner in an arc shape convex outwardly in a tyre radial direction. In the tyre 1 configured as such, it is possible that sufficient ground contacting area is obtained even during cornering with a large camber angle. when the tread portion 2 is developed, a distance in the tyre axial direction between the tread edges (Te) is a tread development width (TWe). In the present specification, for convenience, one of the tread edges (Te) on the left side of a tyre equator (C) is defined as a first tread edge (T1), and one of the tread edges (Te) on the right side of the tyre equator (C) is defined as a second tread edge (T2).

Tyre component members such as a carcass 6, a belt layer 7, and the like are arranged inside the tyre 1 in this embodiment. Known configurations are appropriately used for these tyre component members.

Figure 2:
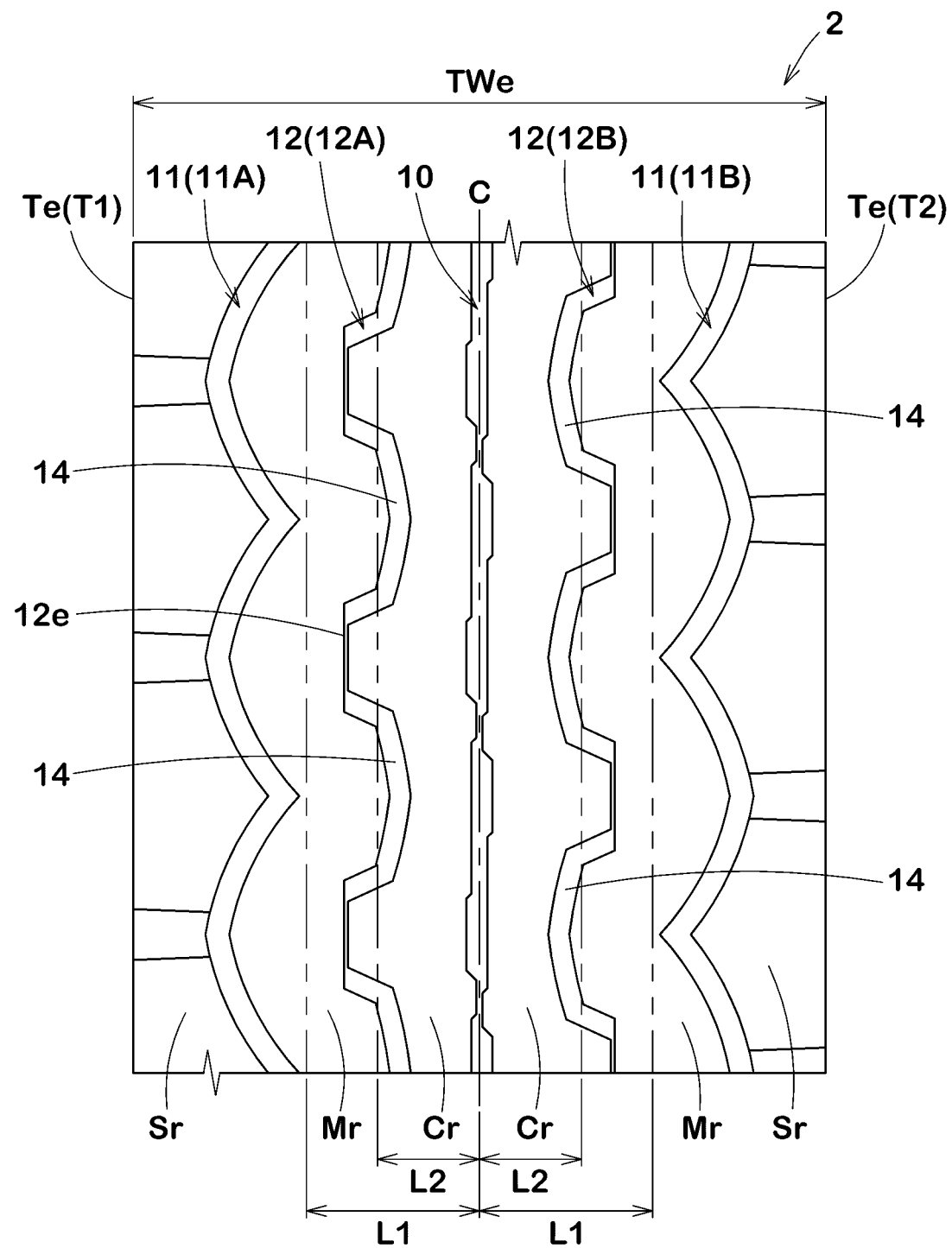
FIG. 2 is a development view of a tread portion of the tyre shown in FIG. 1.

FIG. 2 is a development view of the tread portion 2 of FIG. 1. As shown in FIG. 2, the tread portion 2 in this embodiment is provided with a crown longitudinal groove 10, a pair of shoulder longitudinal grooves 11, and a pair of middle grooves 12.

The crown longitudinal groove 10 in this embodiment extends in the tyre circumferential direction on a side of the tyre equator (C). The crown longitudinal groove 10 in this embodiment is arranged on the tyre equator (C).

The shoulder longitudinal grooves 11 in this embodiment include a first shoulder longitudinal groove (11A) extending in the tyre circumferential direction on a side of the first tread edge (T1) and a second shoulder longitudinal groove (11B) extending in the tyre circumferential direction on a side of the second tread edge (T2). The first shoulder longitudinal groove (11A) in this embodiment is line-symmetric with the second shoulder longitudinal groove (11B) with respect to the tyre equator (C) if it is shifted in the tyre circumferential direction. Thereby, in this specification, description will be made mainly on the first shoulder longitudinal groove (11A) and only the part different from the first shoulder longitudinal groove (11A) will be described with respect to the second shoulder longitudinal groove (11B). Note that the shoulder longitudinal grooves 11 are not limited to such an embodiment, and the first shoulder longitudinal groove (11A) and the second shoulder longitudinal groove (11B) may be formed to have line-asymmetric shapes with each other, for example.

Each of the middle grooves 12 in this embodiment is arranged between the crown longitudinal groove 10 and a respective one of the shoulder longitudinal grooves 11. The middle grooves 12 in this embodiment include a first middle groove (12A) arranged between the crown longitudinal groove 10 and the first shoulder longitudinal groove (11A) and a second middle groove (12B) arranged between the crown longitudinal groove 10 and the second shoulder longitudinal groove (11B). The first middle groove (12A) in this embodiment is line-symmetric with the second middle groove (12B) with respect to the tyre equator (C) if it is shifted in the tyre circumferential direction. In this specification, description will be made mainly on the first middle groove (12A) and only the different parts from the first middle groove (12A) will be described with respect to the second middle groove (12B). Note that the middle grooves 12 are not limited to such an embodiment and the first middle groove (12A) and the second middle groove (12B) may be formed to have line-asymmetric shapes with each other, for example.

Each of the crown longitudinal groove 10, the shoulder longitudinal grooves 11, and the middle grooves 12 in this embodiment extends continuously in the tyre circumferential direction. Thereby, the tread portion 2 in this embodiment is provided with a pair of crown land regions (Cr), a pair of middle land regions (Mr), and a pair of shoulder land regions (sr). Each of the crown land regions (Cr) is defined between the crown longitudinal groove 10 and a respective one of the middle grooves 12. Each of the middle land regions (Mr) is defined between a respective one of the middle grooves 12 and its adjacent one of the shoulder longitudinal grooves 11. Each of the shoulder land regions (sr) is defined between a respective one of the shoulder longitudinal grooves 11 and its adjacent one of the tread edges (Te). Note that the tread portion 2 of the present invention is not limited to such an embodiment.

Figure 3:
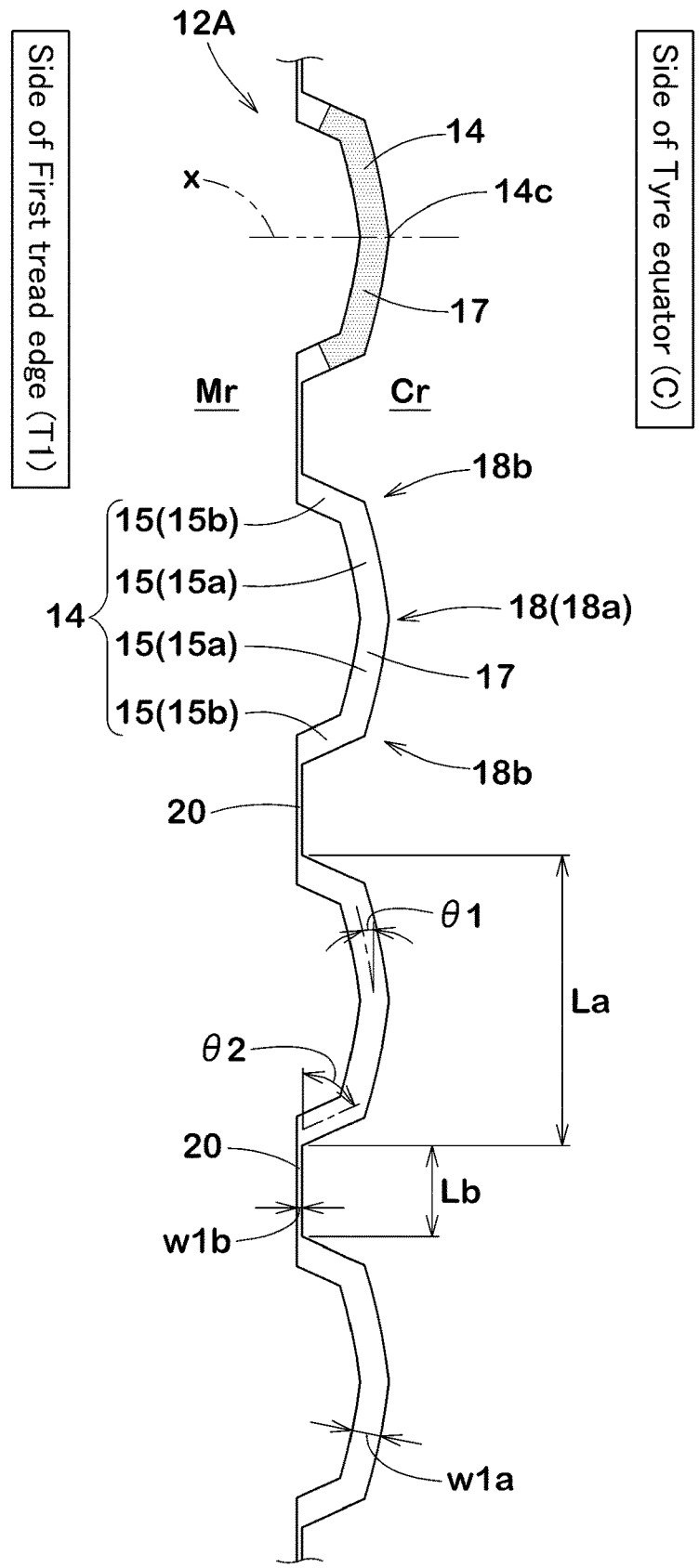
FIG. 3 is an enlarged view of one of middle grooves of FIG. 1.

FIG. 3 is an enlarged view of the first middle groove (12A). As shown in FIG. 3A, the first middle groove (12A) in this embodiment includes a plurality of middle main groove portions 14 arranged in the tyre circumferential direction and each protruding toward the tyre equator (C). The first middle groove (12A) which is formed by a plurality of the middle main groove portions 14 configured as such forms a classic appearance that fits a naked bike, for example.

Each of the middle main groove portions 14 is formed in a bent line shape by three or more linear elements 15 connected with each other in chains, for example. Each of the middle main groove portions 14 in this embodiment is formed by four linear elements 15 arranged in chains. The "linear element 15" is not limited to an embodiment in which it is formed by a groove body extending linearly but also includes an embodiment in which it is formed by a groove body formed by grooves extending in a gentle arc shape and connected with each other so as to form a bent shape.

As shown in FIG. 1, each of the middle main groove portions 14 includes a shallow bottom portion 17 having a depth smaller than a maximum groove depth (d2) of each of the shoulder longitudinal grooves 11 and a maximum groove depth (d1) of the crown longitudinal groove 10. By the shallow bottom portions 17 configured as such, rigidity of the crown land regions (Cr) or the middle land regions (Mr) in the vicinity of the middle main groove portions 14 is maintained high. Thereby, in the peripheral regions of the middle main groove portions 14, rigidity difference becomes small between the portions where the grooves are formed and the portions where the grooves are not formed, therefore, the generation of the uneven wear is suppressed. Each of the middle main groove portions 14 is provided with the shallow bottom portion 17 in this embodiment.

The shallow bottom portions 17 in this embodiment are arranged on an outer side in the tyre radial direction of a virtual line (k) obtained by smoothly connecting groove bottoms (11s) where the shoulder longitudinal grooves 11 have the maximum groove depths (d2) and a groove bottom (10s) where the crown longitudinal groove 10 has the maximum groove depth (d1) along an outer surface profile (2s) of the tread portion 2. Thereby, the rigidity of the crown land regions (Cr) or the middle land regions (Mr) in the vicinity of the middle main groove portions 14 is maintained at a higher level. In this specification, the outer surface profile (2s) means the tread ground contacting surface (2a) obtained by filling all the grooves of the tread portion 2 of the tyre 1 in the standard state.

It is particularly preferred that a groove depth (d3a) of the shallow bottom portion 17 is smaller by 0.5 mm or more than the larger one of the maximum groove depth (d2) of the shoulder longitudinal grooves 11 and the maximum groove depth (d1) of the crown longitudinal groove 10, and 0.6 times or more of the larger one of the maximum groove depth (d2) of the shoulder longitudinal grooves 11 and the maximum groove depth (d1) of the crown longitudinal groove 10. If the groove depth (d3a) of the shallow bottom portion 17 is less than 0.6 times of the larger one described above, the shallow bottom portion 17 becomes difficult to be observed, therefore, it is possible that the classic appearance is not provided, for example. If the groove depth (d3a) of the shallow bottom portion 17 is smaller than the larger one described above by less than 0.5 mm, it is possible that the rigidity of the crown land regions (Cr) or the middle land regions (Mr) in the vicinity of the middle main groove portions 14 cannot be maintained high.

Although not particularly limited, it is preferred that a maximum groove depth (d3) of each of the middle grooves 12 is 3.5 mm or more and 4.5 mm or less, for example. It is preferred that the maximum groove depth (d1) of the crown longitudinal groove 10 is 4.0 mm or more and 5.5 mm or less, for example. It is preferred that the maximum groove depth (d2) of each of the shoulder longitudinal grooves 11 is 3.5 mm or more and 4.5 mm or less.

As shown in FIG. 2, it is preferred that each of outer ends (12e) in the tyre axial direction of the first middle groove (12A) is arranged at a position within 25% of the tread development width (TWe) from the tyre equator (C) toward the first tread edge (Ti). In the tyre 1, a region of a distance (L1) which is 25% of the tread development width (TWe) from the tyre equator (C) toward each of the tread edges (Te) is the region which is more likely to come into contact with the ground during running and therefore the region which is relatively more likely to wear due to a load in the tyre circumferential direction. Thereby, by providing the shallow bottom portions 17 in the middle grooves 12 arranged in this region, it is possible that the generation of the uneven wear is effectively suppressed. Further, in the tyre 1, a region of a distance (L2) which is 15% of the tread development width (TWe) from the tyre equator (C) toward each of the tread edges (Te) is the region in which lateral force applied thereto during cornering is small and therefore the region which is relatively less likely to wear due to a load in the tyre axial direction. Thereby, since the outer ends (12e) in the tyre axial direction of the first middle groove (12A) are arranged at the positions of 15% or more of the tread development width (Twe) from the tyre equator (C) toward the first tread edge (T1), the suppression effect of the uneven wear by the first middle groove (12A) is effectively exerted.

As shown in FIG. 3, each of the middle main groove portions 14 in this embodiment is line-symmetric with respect to a tyre axial direction line (x) passing through a center position (14c) in the tyre circumferential direction of the middle main groove portion 14. The middle main groove portions 14 configured as such decrease rigidity difference between both sides in the tyre circumferential direction of each of the center positions (14c) of the crown land regions (Cr) and the middle land regions (Mr), therefore, the uneven wear is suppressed.

Each of the middle main groove portions 14 in this embodiment is formed by a pair of first linear elements (15a) and a pair of second linear elements (15b) each connected with a respective one of the first linear elements (15a). In each of the middle main groove portions 14, the pair of the first linear elements (15a) is inclined toward the first tread edge (T1) from the center position (14c) on both sides thereof in the tyre circumferential direction, for example. Each of the second linear elements (15b) is connected with an outer end of a respective one of the first linear elements (15a), has an angle larger than each of the first linear elements (15a) with respect to the tyre circumferential direction and inclined to the same direction as the first linear element (15a) adjacent thereto, for example.

Each of the middle main groove portions 14 in this embodiment has bent portions 18 formed by the linear elements 15 connected with each other. Each of the middle main groove portions 14 in this embodiment includes a first bent portion (18a) formed by connection of a pair of the first linear elements (15a) and a pair of second bent portions (18b) each formed by connection of a respective one of the first linear elements (15a) and its adjacent one of the second linear elements (15b). In each of the middle main groove portions 14 in this embodiment, the first bent portion (18a) is arranged on the center position (14c). The pair of the second bent portions (18b) is arranged on both sides in the tyre circumferential direction of the center position (14c).

Although not particularly limited, it is preferred that an angle θ1 of each of the first linear elements (15a) with respect to the tyre circumferential direction is 5 degrees or more and 20 degrees or less. Further, it is preferred that an angle θ2 of each of the second linear elements (15b) with respect to the tyre circumferential direction is 55 degrees or more and 75 degrees or less. Thereby, the middle main groove portions 14 have more classic appearance.

In each of the middle main groove portions 14, the shallow bottom portion 17 is provided between the pair of the second bent portions (18b), for example. Thereby, the rigidity of the crown land regions (Cr) and the middle land regions (Mr) is increased in portions where loads are likely to concentrate, therefore, generation of the uneven wear is suppressed. It is preferred that the shallow bottom portion 17 are provided so as to extend beyond the pair of the second bent portions (18b) to the outer side thereof in the tyre circumferential direction. In FIG. 3, for the sake of convenience, one of the shallow bottom portions 17 is shaded.

In each of the middle main groove portions 14, the shallow bottom portion 17 may be formed over the entire length of the middle main groove portion 14, for example. In such an embodiment, the effects described above is exerted more effectively.

The first middle groove (12A) is formed by indirectly connecting the middle main groove portions 14 via middle joint groove portions 20, for example. The middle main groove portions 14 and the middle joint groove portions 20 in this embodiment are arranged alternately in the tyre circumferential direction.

Each of the middle joint groove portions 20 in this embodiment is formed to have a groove width (W1b) smaller than a groove width (W1a) of each of the middle main groove portions 14. The middle joint groove portions 20 configured as such maintain the rigidity of the crown land regions (Cr) and the middle land regions (Mr) high.

Although not particularly limited, it is preferred that the groove width (W1b) of each of the middle joint groove portions 20 is 5% or more and 60% or less of the groove width (W1a) of each of the middle main groove portions 14. Thereby, classic appearance of the tyre 1 and the suppression of the uneven wear are improved in a good balance. Note that it is preferred that the groove width (W1a) of each of the middle main groove portions 14 is 2% or more and 5% or less of the tread development width (TWe).

Each of the middle joint groove portions 20 extends in the tyre circumferential direction, for example. Each of the middle joint groove portions 20 in this embodiment extends in parallel with the tyre circumferential direction. By the middle joint groove portions 20 configured as such, the rigidity in the tyre circumferential direction of the portions in the vicinity of the middle joint groove portions 20 of the crown land regions (Cr) and the middle land regions (Mr) is maintained high.

The middle joint groove portions 20 are arranged closest to the first tread edge (T1) among the portions of the first middle groove (12A), for example. That is, the middle joint groove portions 20 in this embodiment are arranged on the outer side in the tyre axial direction of the region which is likely to come into contact with the ground. As described above, the rigidity in the tyre circumferential direction of the crown land regions (Cr) and the middle land regions (Mr) in the portions in the vicinity of the middle joint groove portions 20 is maintained high by the middle joint groove portions 20. Thereby, even in the regions described above, generation of the uneven wear is effectively suppressed.

In order to the effectively suppress generation of the uneven wear and to maintain the classic appearance at the same time, it is preferred that a length (Lb) in the tyre circumferential direction of each of the middle joint groove portions 20 is 25% or more and 45% or less of a length (La) in the tyre circumferential direction of each of the middle main groove portions 14.

Figure 4:
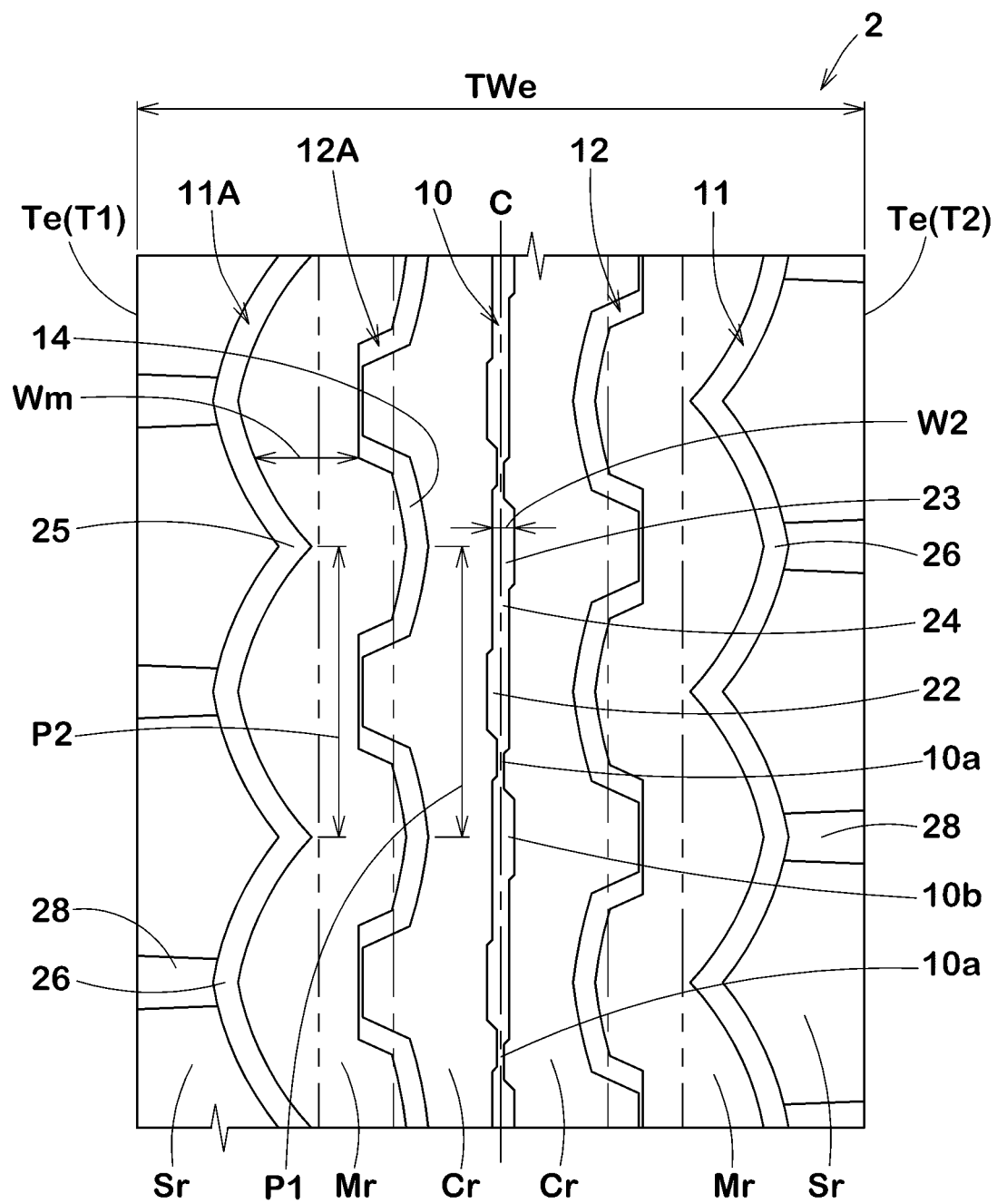
FIG. 4 is a development view of the tread portion according to the present embodiment.

FIG. 4 is a development view of the tread portion 2 in this embodiment. As shown in FIG. 4, the crown longitudinal groove 10 in this embodiment has a groove width (W2) in the tyre axial direction varying in the tyre circumferential direction. The crown longitudinal groove 10 is formed by first crown groove portions (10a) and second crown groove portions (10b) arranged alternately in the tyre circumferential direction, for example. Each of the first crown groove portions (10a) has a constant groove width and each of the second crown groove portions (10b) has a groove width larger than that of each of the first crown groove portions (10a).

Each of the second crown groove portions (10b) in this embodiment includes a first crown protruding portion 22, a second crown protruding portion 23, and a crown joint portion 24. The first crown protruding portion 22 includes a protruding portion protruding toward the first tread edge (T1). The second crown protruding portion 23 includes a protruding portion protruding toward the second tread edge (T2). The crown joint portion 24 is sandwiched between the first crown protruding portion 22 and the second crown protruding portion 23 and has a groove width smaller than that of each of the first crown protruding portion 22 and the second crown protruding portion 23. The crown longitudinal groove 10 configured as such also forms a classic appearance. Note that the crown longitudinal groove 10 is not limited to such an embodiment, and it may be embodied in various forms.

The first shoulder longitudinal groove (11A) in this embodiment has a plurality of shoulder protruding portions 25 each protruding toward the tyre equator (C). Each of the shoulder protruding portions 25 in this embodiment extends in a manner so as to be bent toward the tyre equator (C). The shoulder longitudinal grooves 11 configured as such also improves the classic appearance.

The middle main groove portions 14 and the shoulder protruding portions 25 in this embodiment are aligned in the tyre circumferential direction. The shoulder protruding portions 25 configured as such decrease variation of a width (Wm) in the tyre axial direction of each of the middle land regions (Mr) over the tyre circumferential direction, therefore, the rigidity difference in the tyre axial direction of each of the middle land regions (Mr) is made small. In order to effectively exert the effects described above, it is preferred that a pitch (P1) of the middle main groove portions 14 is equal to a pitch (P2) of the shoulder protruding portions 25.

The first shoulder longitudinal groove (11A) has a plurality of shoulder outer protruding portions 26 protruding toward the first tread edge (T1), for example. Each of the shoulder outer protruding portions 26 in this embodiment protrudes in an arc shape. The shoulder outer protruding portions 26 and the shoulder protruding portions 25 in this embodiment are arranged alternately in the tyre circumferential direction. Thereby, the classic appearance is further improved.

Each of the shoulder outer protruding portions 26 in this embodiment is formed in a gentler arc shape (that is, having a larger radius of curvature) than each of the shoulder protruding portions 25 and arranged on the outer side in the tyre axial direction of the shoulder protruding portions 25. The shoulder outer protruding portions 26 configured as such suppress decrease in the rigidity of the axially outer region to which large lateral force is applied during cornering, therefore, the uneven wear is suppressed. Note that the first shoulder longitudinal groove (11A) is not limited to such an embodiment, and it may be embodied in various forms.

Each of the shoulder land regions (Sr) is provided with shoulder lateral grooves 28 each connecting a respective one of the shoulder outer protruding portions 26 and the tread edges (Te). Each of the shoulder lateral grooves 28 in this embodiment extends in parallel with the tyre axial direction, therefore, a length thereof in the tyre axial direction is formed small. Thereby, the rigidity of the shoulder land regions (Sr) is maintained high.

Figure 5:
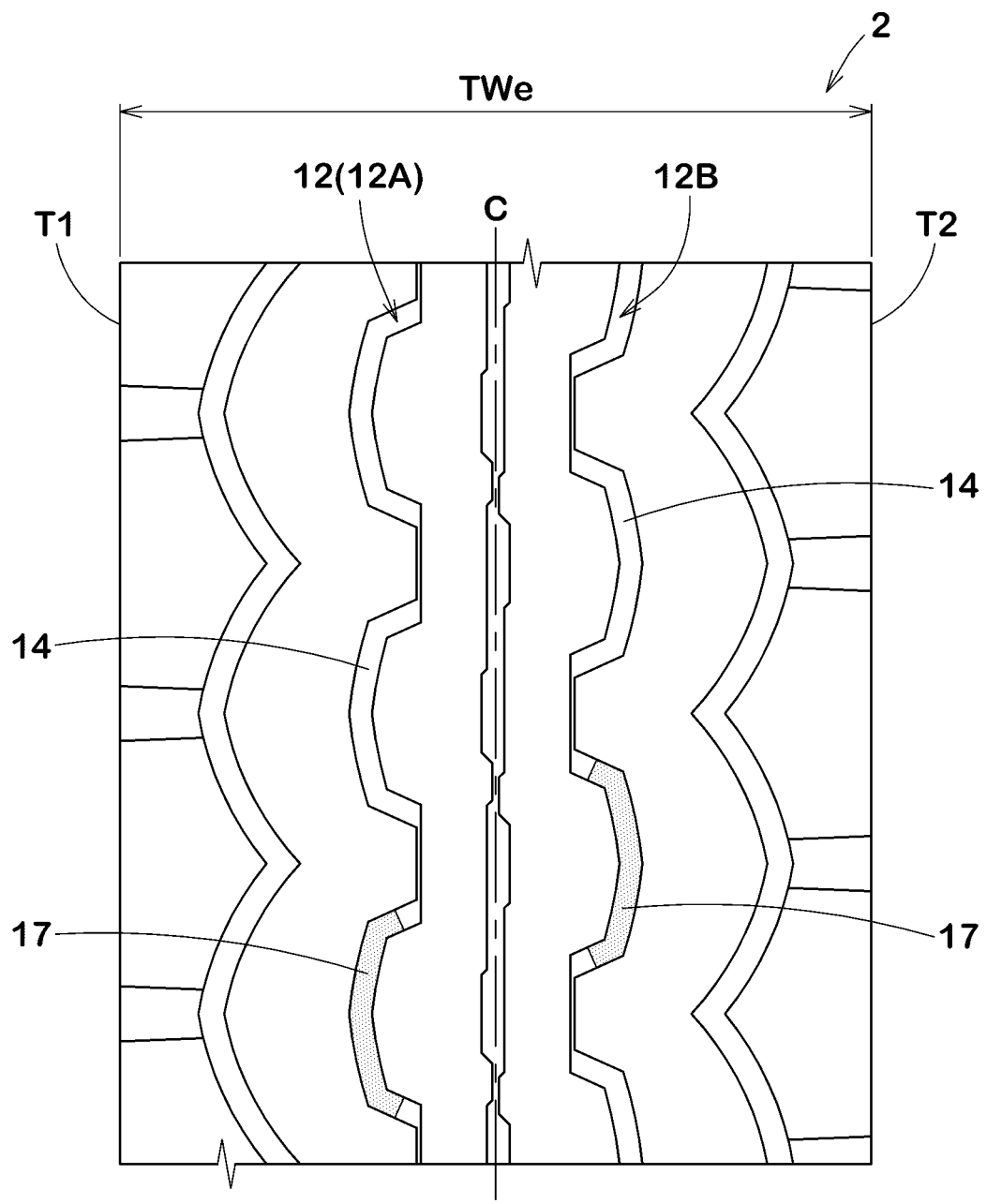
FIG. 5 is a development view of the tread portion according to another embodiment.

FIG. 5 is a development view of the tread portion 2 according to another embodiment of the present invention. The same reference numerals are given to the elements common to those of the tread portion 2 in the embodiment shown in FIGS. 1 to 4, and the explanations thereof are omitted here. As shown in FIG. 5, the first middle groove (12A) is provided with the middle main groove portions 14 each protruding toward the first tread edge (T1), for example. The first middle groove (12A) configured as such also has the classic appearance. Further, each of the middle main groove portions 14 in this embodiment has the shallow bottom portion 17 having the groove depth smaller than the maximum groove depth (d2) of each of the shoulder longitudinal grooves 11 and the maximum groove depth (d1) of the crown longitudinal groove 10, therefore, the uneven wear resistance performance is improved.

Figure 6A:
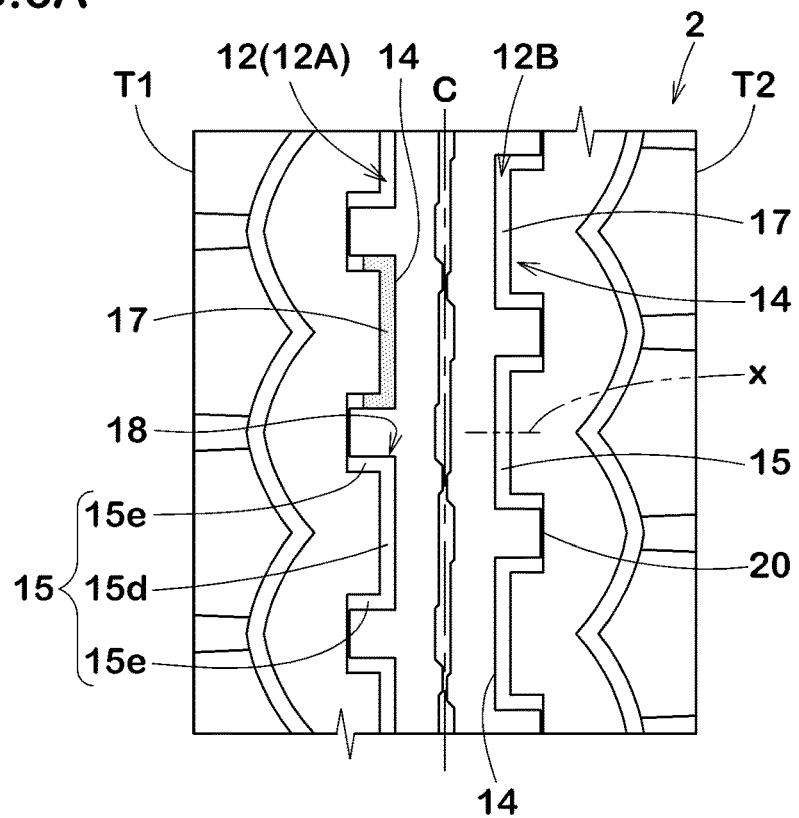
FIG. 6A is a development view of the tread portion according to yet another embodiment.
Figure 6B:
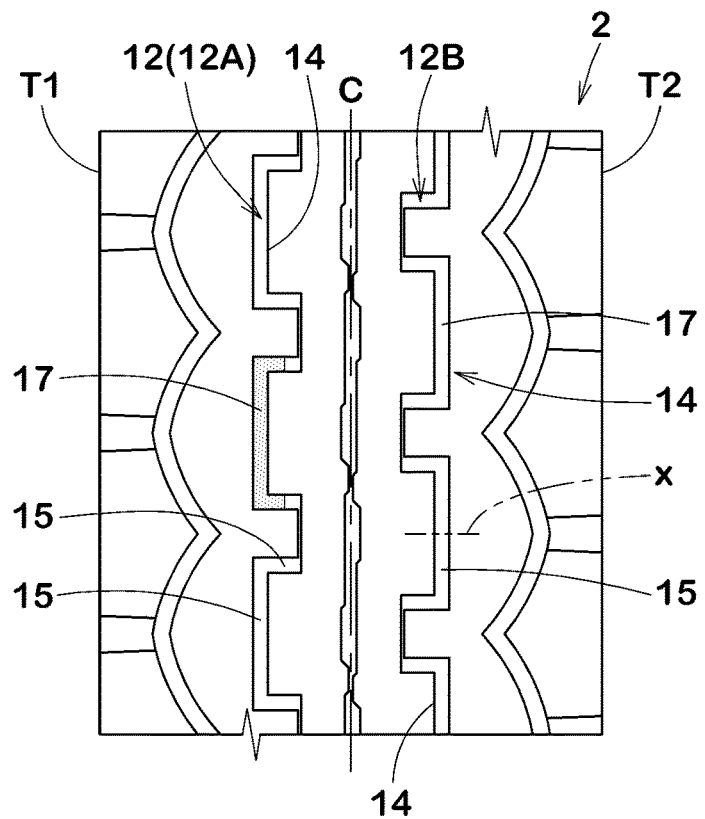
FIG. 6B is a development view of the tread portion according to further another embodiment.

FIG. 6A is a development view of the tread portion 2 according to yet another embodiment of the present invention. The same reference numerals are given to the elements common to those of the tread portion 2 in the embodiment shown in FIGS. 1 to 4, and the explanations thereof are omitted here. As shown in FIG. 6A, each of the middle main groove portions 14 in thi s embodiment is formed by three linear elements 15. Each of the linear elements 15 of the first middle groove (12A) is formed so as to include a circumferential direction element (15d) extending along the tyre circumferential direction and a pair of axial direction elements (15e) extending along the tyre axial direction from both ends of the circumferential direction element (15d) toward the first tread edge (T1), for example. The middle main groove portions 14 configured as such also form the classic appearance. The circumferential direction element (15d) in this embodiment extends in parallel with the tyre circumferential direction. Each of the axial direction elements (15e) in this embodiment extends in parallel with the tyre axial direction. Note that as shown in FIG. 6A, each of the middle main groove portions 14 may protrude toward the first tread edge (T1).

Figure 7A:
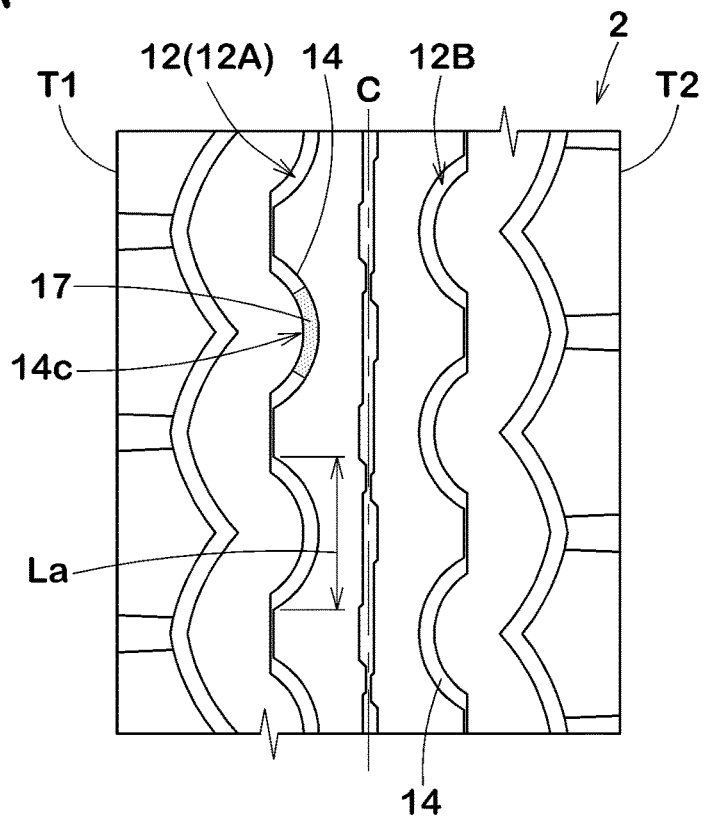
FIG. 7A is a development view of the tread portion according to further another embodiment.

FIG. 7A is a development view of the tread portion 2 according to further another embodiment of the present invention. The same reference numerals are given to the elements common to those of the tread portion 2 in the embodiment shown in FIGS. 1 to 4, and the explanations thereof are omitted here. As shown in FIG. 7A, each of the middle main groove portions 14 in this embodiment is formed in an arc shape. The middle grooves 12 configured as such also form the classic appearance.

Figure 7B:
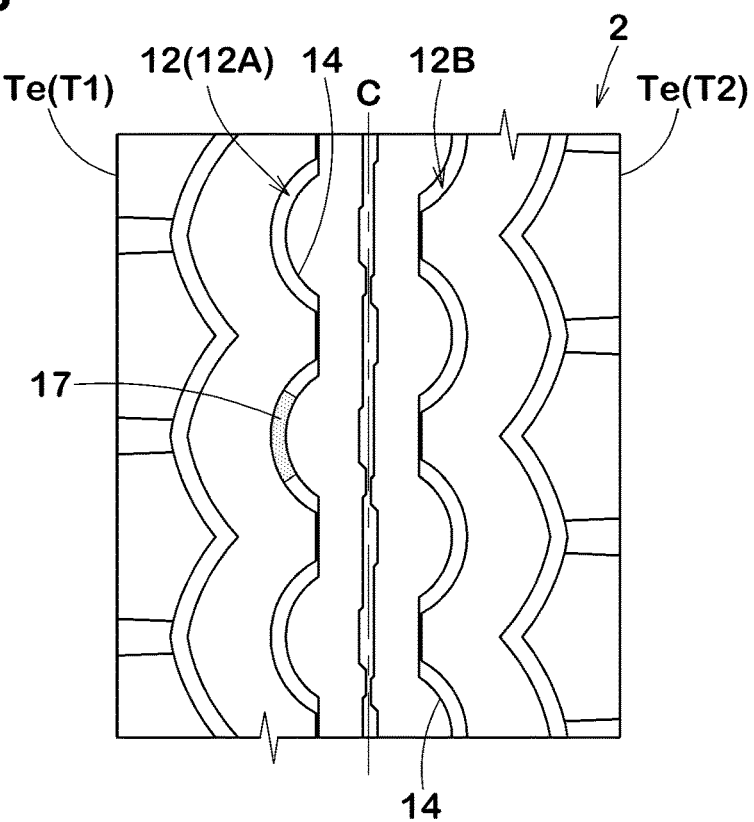
FIG. 7B is a development view of the tread portion according to further another embodiment.

In each of the middle main groove portions 14 in this embodiment, it is preferred that the shallow bottom portion 17 is formed over the region of 25% or more of the length (La) in the tyre circumferential direction of the middle main groove portion 14 from the center position (14c) in the tyre circumferential direction on both sides in the tyre circumferential direction of the middle main groove portion 14. Further, the shallow bottom portion 17 may be formed over the entire length of the middle main groove portion 14, for example. Note that, as shown in FIG. 7B, each of the middle main groove portions 14 may protrude toward a respective one of the tread edges (Te).

Figure 8A:
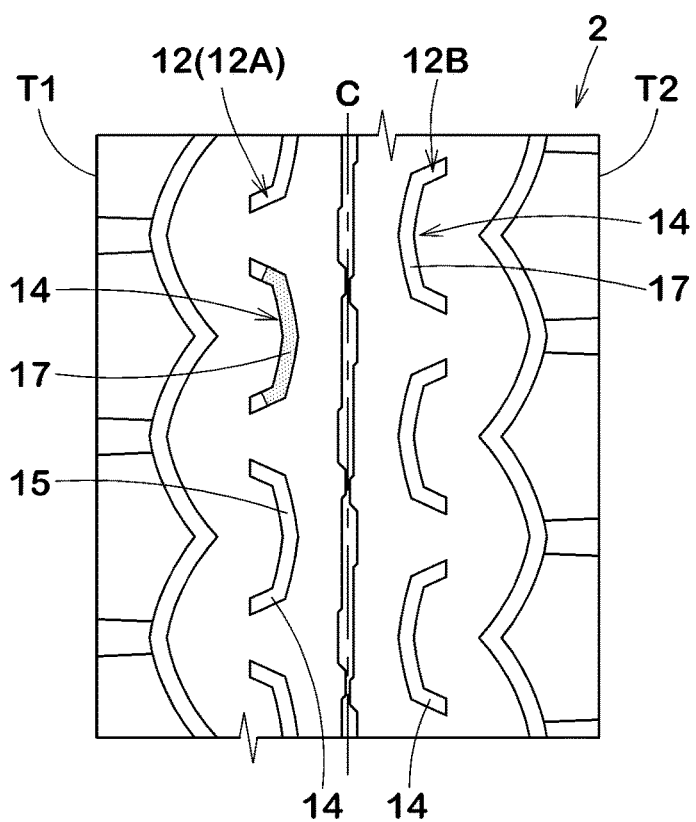
FIG. 8A is a development view of the tread portion according to further another embodiment.
Figure 8B:
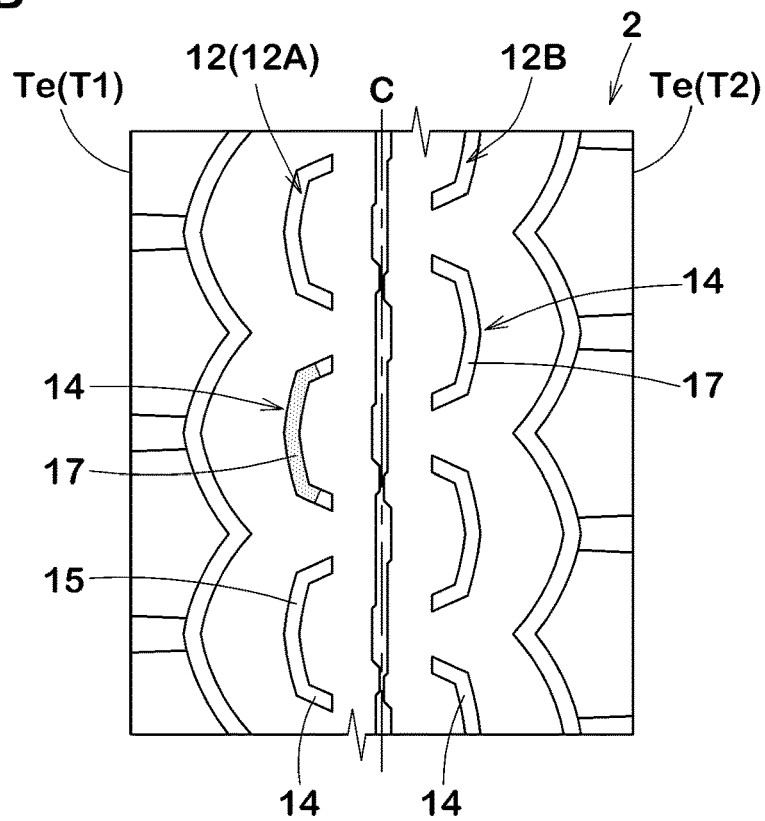
FIG. 8B is a development view of the tread portion according to further another embodiment.

FIG. 8A is a development view of the tread portion 2 according to further another embodiment of the present invention. The same reference numerals are given to the elements common to those of the tread portion 2 in the embodiment shown in FIGS. 1 to 4, and the explanations thereof are omitted here. As shown in FIG. 8A, the middle main groove portions 14 in this embodiment are not directly or indirectly connected but spaced away from each other, and the middle grooves 12 are formed only by the middle main groove portions 14. Thereby, the uneven wear is further suppressed. Each of the middle main groove portions 14 in this embodiment is formed in a bent line shape by four linear elements 15, but it is not limited to such an embodiment, and it may be formed in other bent line shapes or in an arc shape, for example. Further, as shown in FIG. 8B, each of the middle main groove portions 14 may protrude toward a respective one of the tread edges (Te).

Figure 9A:
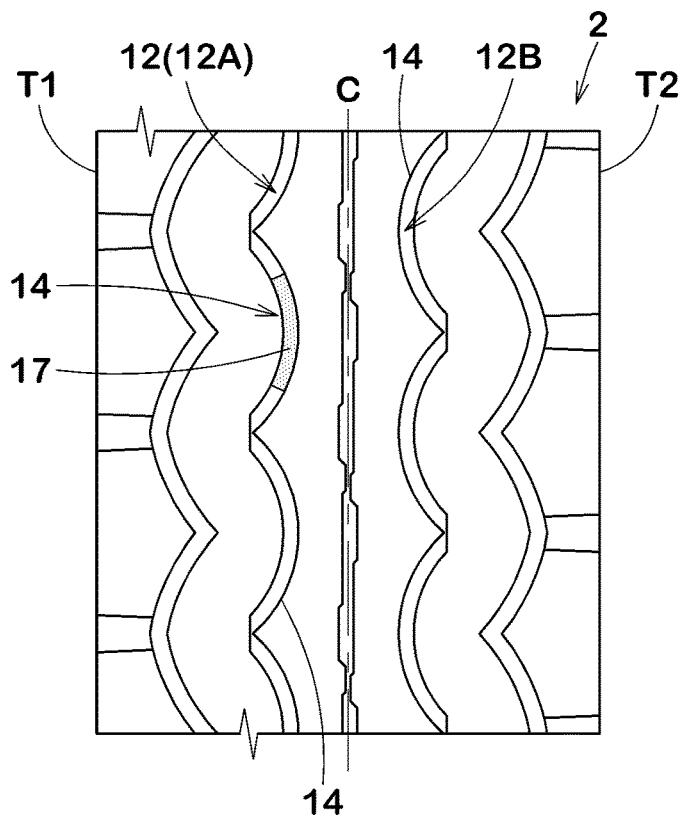
FIG. 9A is a development view of the tread portion according to further another embodiment.
Figure 9B:
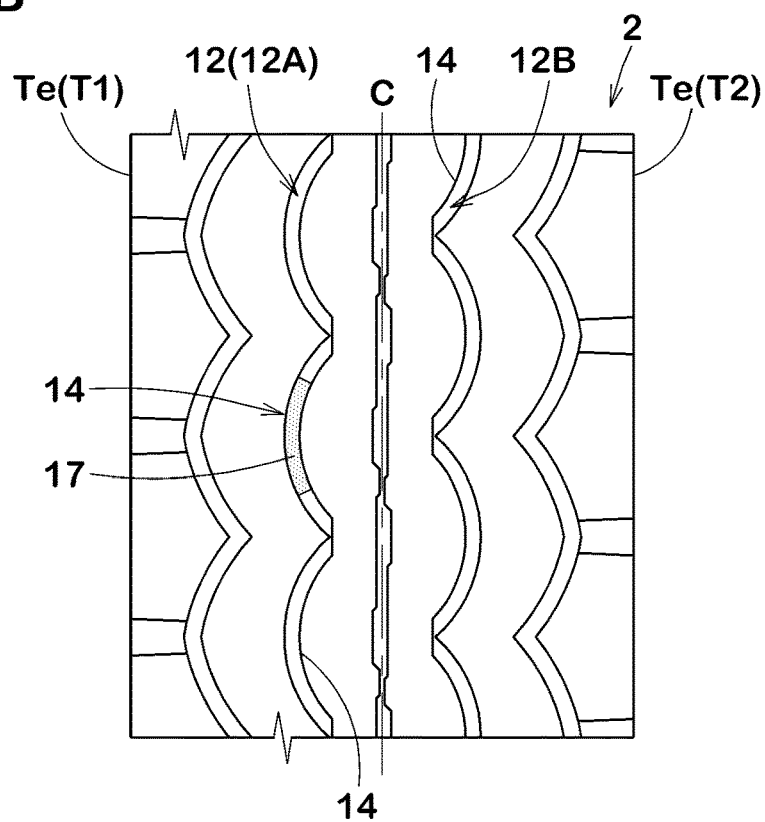
FIG. 9B is a development view of the tread portion according to further another embodiment.

FIG. 9A is a development view of the tread portion 2 according to further another embodiment of the present invention. The same reference numerals are given to the elements common to those of the tread portion 2 in the embodiment shown in FIGS. 1 to 4, and the explanations thereof are omitted here. As shown in FIG. 9A, each of the middle main groove portions 14 in this embodiment is formed in an arc shape. The middle main groove portions 14 are directly connected with each other, therefore, each of the middle grooves 12 is formed only by the middle main groove portions 14. The middle grooves 12 configured as such also form the classic appearance. Note that, as shown in FIG. 9B, each of the middle main groove portions 14 may protrude toward a respective one of the tread edges (Te).

While detailed description has been made of the tyre as an embodiment of the present invention, it is needless to say that the present invention can be embodied in various forms without being limited to the illustrated embodiments.

WORKING EXAMPLES (EXAMPLES)

Tyres for a motorcycle having the basic pattern shown in FIG. 1 were made by way of test according to the specifications listed in Table 1, and then each of the test tyres was tested for the uneven wear resistance performance. Common specifications of the test tyres and the test method were as follows.

Depth of each of Crown longitudinal groove, shoulder longitudinal groove, and virtual line: 4.0 mm Groove depth of shallow bottom portion: 3.2 mm <Uneven Wear Resistance Performance>

Each of the test tyres were mounted on a test vehicle described below and a test rider drove the test vehicle on a dry asphalt road surface of a test course for a distance of 5000 km, and then the generation of the uneven wear after the test run was observed. The uneven wear resistance performance was evaluated by the driver's feeling and the test results are indicated by an evaluation point on a scale of 1 to 5, wherein a larger numerical value is better.

Tyre: 120/70ZR17 (front wheel), 180/55ZR17 (rear wheel)

Tyre rim: MT3.50 (front wheel), MT5.50 (rear wheel)

Tyre inner pressure: 250 kPa (front wheel), 290 kPa (rear wheel)

Test vehicle: motorcycle with displacement of 1300 cc

The test results and the like are shown in Table 1. The "r Range of Shallow bottom portion [%]" in Table 1 means, in each of the middle main groove portions, a ratio of the length in the tyre circumferential direction of the middle main groove portion with respect to a distance between the center position of the middle main groove portion and one of outer ends in the tyre circumferential direction of the shallow bottom portion. The "Position of Outer end of Middle groove" means a ratio of a distance between the tyre equator and one of the outer ends in the tyre axial direction of the middle groove with respect to the tread development width.

Further, Example 1 is an example in which, in each of the middle main groove portions, the shallow bottom portion terminates on the inner sides in the tyre circumferential direction of the bent portions positioned on both sides in the tyre circumferential direction of the center position of the middle main groove portion. Example 2 is an example in which, in each of the middle main groove portions, the shallow bottom portion terminates on the outer sides in the tyre circumferential direction of the bent portions.

middle main groove portions is line-symmetric with respect to a tyre axial direction line passing through a center position in the tyre circumferential direction of the middle main groove portion.

4. The tyre for a motorcycle according to claim 3, wherein each of the middle main groove portions has a pair of bent portions formed by the linear elements connected with each other on both sides in the tyre circumferential direction of the center position, and

TABLE 1

|  | Ref. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Figure showing shape of Tread portion | FIG. 2 | FIG. 2 | FIG. 2 | FIG. 2 | FIG. 2 | FIG. 8A | FIG. 8A | FIG. 7A | FIG. 7A |
| Groove depth of Middle main groove portion [mm] | 4.0 | 4.0 | 4.0 | 3.2 | 3.2 | 3.2 | 3.2 | 4.0 | 4.0 |
| Range of Shallow bottom portion [%] | — | 30 | 70 | 100 | 100 | 100 | 100 | 30 | 70 |
| Groove width (w1a) of Middle main groove portion [mm] | 5.0 | 5.0 | 5.0 | 5.0 | 5.0 | 5.0 | 5.0 | 5.0 | 5.0 |
| Groove width (w1b) of Middle joint groove portion [mm] | 5.0 | 5.0 | 5.0 | 5.0 | 2.5 | 0 | 0 | 5.0 | 5.0 |
| Position of Outer end of Middle groove | 20 | 20 | 20 | 20 | 20 | 20 | 15 | 20 | 20 |
| Uneven wear resistance performance [evaluation point: larger numerical value is better] | 2.0 | 3.0 | 3.5 | 3.5 | 4.0 | 4.5 | 5.0 | 3.0 | 3.5 |

From the test results, it was confirmed that the uneven wear was suppressed for the tyres in the Examples compared with the tyres in Reference. Thereby, the tyres in the Examples maintained the classic appearance compared with the tyres in the Reference.

The invention claimed is:

1. A tyre for a motorcycle comprising a tread portion comprising a crown longitudinal groove extending in a tyre circumferential direction on a side of a tyre equator, a shoulder longitudinal groove extending in the tyre circumferential direction on a side of a first tread edge, and a middle groove arranged between the crown longitudinal groove and the shoulder longitudinal groove, wherein the middle groove includes a plurality of middle main groove portions arranged in the tyre circumferential direction and each protruding toward the tyre equator or the first tread edge, each of the middle main groove portions is formed in a bent line shape or in an arc shape by three or more linear elements connected with each other, each of the middle main groove portions includes a shallow bottom portion having a groove depth smaller than a maximum groove depth of the shoulder longitudinal groove and a maximum groove depth of the crown longitudinal groove, the middle groove is formed by the middle main groove portions indirectly connected with each other via middle joint groove portions and a groove width of each of the middle joint groove portions is smaller than a groove width of each of the middle main groove portions.

2. The tyre for a motorcycle according to claim 1, wherein the shallow bottom portion is arranged on an outer side in a tyre radial direction of a virtual line obtained by smoothly connecting a groove bottom where the shoulder longitudinal groove has the maximum groove depth and a groove bottom where the crown longitudinal groove has the maximum groove depth along an outer surface profile of the tread portion.

3. The tyre for a motorcycle according to claim 1, wherein when the tread portion is developed in a plane, each of the the shallow bottom portion is provided between the pair of the bent portions.

5. The tyre for a motorcycle according to claim 4, wherein the shallow bottom portion is formed over the entire length of each of the middle main groove portions.

6. The tyre for a motorcycle according to claim 3, wherein each of the middle main groove portions is formed by a pair of first linear elements and a pair of second linear elements each connected with a respective one of the first linear elements, and the pair of the first linear elements is inclined toward the first tread edge from the center position on both sides thereof in the tyre circumferential direction.

7. The tyre for a motorcycle according to claim 6, wherein each of the second linear elements is connected with an outer end of a respective one of the first linear elements, has an angle larger than each of the first linear elements with respect to the tyre circumferential direction and is inclined to the same direction as the first linear element adjacent thereto.

8. The tyre for a motorcycle according to claim 6, wherein an angle of each of the first linear elements with respect to the tyre circumferential direction is 5 degrees or more and 20 degrees or less.

9. The tyre for a motorcycle according to claim 6, wherein an angle of each of the second linear elements with respect to the tyre circumferential direction is 55 degrees or more and 75 degrees or less.

10. The tyre for a motorcycle according to claim 1, wherein the shallow bottom portion is formed over a region of 25% or more of a length in the tyre circumferential direction of each of the middle main groove portions from the center position on both sides thereof in the tyre circumferential direction.

11. The tyre for a motorcycle according to claim 1, wherein the groove depth of the shallow bottom portion is smaller by 0.5 mm or more than the larger one of the maximum groove depth of the shoulder longitudinal groove and the maximum groove depth of the crown longitudinal groove, and 0.6 times or more of the larger one of the maximum groove depth of the shoulder longitudinal groove and the maximum groove depth of the crown longitudinal groove.

12. The tyre for a motorcycle according to claim 1, wherein an outer end in the tyre axial direction of the middle groove is arranged at a position within 25% of a tread development width from the tyre equator toward the first tread edge.

13. The tyre for a motorcycle according to claim 1, wherein the shoulder longitudinal groove has a plurality of shoulder protruding portions each extending continuously in the tyre circumferential direction and protruding toward the tyre equator or the first tread edge, and the middle main groove portions and the shoulder protruding portions are aligned in the tyre circumferential direction.

14. The tyre for a motorcycle according to claim 1, wherein a groove width of each of the middle joint groove portions is 5% or more and 60% or less of a groove width of each of the middle main groove portions.

15. The tyre for a motorcycle according to claim 1, wherein a groove width of each of the middle main groove portions is 2% or more and 5% or less of a tread development width.

16. The tyre for a motorcycle according to claim 1, wherein a length in the tyre circumferential direction of each of the middle joint groove portions is 25% or more and 45% or less of a length in the tyre circumferential direction of each of the middle main groove portions.

17. A tyre for a motorcycle comprising a tread portion comprising a crown longitudinal groove extending in a tyre circumferential direction on a side of a tyre equator, a shoulder longitudinal groove extending in the tyre circumferential direction on a side of a first tread edge, and a middle groove arranged between the crown longitudinal groove and the shoulder longitudinal groove, wherein the middle groove includes a plurality of middle main groove portions arranged in the tyre circumferential direction and each protruding toward the tyre equator or the first tread edge, each of the middle main groove portions is formed in a bent line shape or in an arc shape by three or more linear elements connected with each other, each of the middle main groove portions includes a shallow bottom portion having a groove depth smaller than a maximum groove depth of the shoulder longitudinal groove and a maximum groove depth of the crown longitudinal groove, when the tread portion is developed in a plane, each of the middle main groove portions is line-symmetric with respect to a tyre axial direction line passing through a center position in the tyre circumferential direction of the middle main groove portion, each of the middle main groove portions is formed by a pair of first linear elements and a pair of second linear elements each connected with a respective one of the first linear elements, the pair of the first linear elements is inclined toward the first tread edge from the center position on both sides thereof in the tyre circumferential direction and each of the second linear elements is connected with an outer end of a respective one of the first linear elements, has an angle larger than each of the first linear elements with respect to the tyre circumferential direction and is inclined to the same direction as the first linear element adjacent thereto.

\* \* \* \* \*